United States Patent [19]

Wambach

[11] Patent Number: 5,444,462
[45] Date of Patent: Aug. 22, 1995

[54] COMPUTER MOUSE GLOVE WITH REMOTE COMMUNICATION

[76] Inventor: Mark L. Wambach, 180 Raeburn Ave., Rochester, N.Y. 14619

[21] Appl. No.: 807,197

[22] Filed: Dec. 16, 1991

[51] Int. Cl.[6] .............................. G09G 3/02
[52] U.S. Cl. ................................... 345/158
[58] Field of Search ............... 340/706, 709, 710; 341/20, 22; 400/489; 345/156, 157, 158, 168, 169

[56] References Cited

U.S. PATENT DOCUMENTS

| | | | |
|---|---|---|---|
| 3,022,878 | 2/1962 | Seibel et al. | 345/169 |
| 3,541,541 | 11/1970 | Engelbart | 340/710 |
| 4,313,227 | 6/1982 | Eder | 340/709 |
| 4,414,537 | 11/1983 | Grimes | 340/365 R |
| 4,540,176 | 9/1985 | Baer | 273/148 B |
| 4,613,139 | 9/1986 | Robinson | 273/148 B |
| 4,682,159 | 7/1987 | Davison | 340/709 |
| 4,905,001 | 2/1990 | Penner | 341/20 |
| 4,954,817 | 9/1990 | Levine | 345/179 |
| 4,977,397 | 12/1990 | Kuo et al. | 340/710 |
| 4,988,981 | 1/1991 | Zimmerman | 340/709 |
| 5,021,771 | 6/1991 | Lachman | 340/706 |
| 5,144,594 | 9/1992 | Gilchrist | 178/18 |

FOREIGN PATENT DOCUMENTS 1245782  11/1988  Canada ........................ 340/709

*Primary Examiner*—Richard Hjerpe
*Assistant Examiner*—Lun-Yi Lao
*Attorney, Agent, or Firm*—Robert M. Wallace

[57] ABSTRACT

A glove worn on the hand of a computer operator provides a computer mouse function for a computer having a video display highlighted by a cursor, in which the apparatus senses the direction of movement of an element of a computer operator's body and transmits corresponding commands to the computer to move the cursor in the video display in a corresponding direction, whereby two-dimensional movement of the cursor reflects movements of the body element. In one embodiment of the invention, cursor motion is controlled by lateral motion of the operator's wrist and vertical motion of the operator's index finger, whereby movement of said cursor follows the direction of movement of the wrist and index finger. Click button on various fingers of the glove are activated by the thumb to provide mouse click functions.

12 Claims, 5 Drawing Sheets

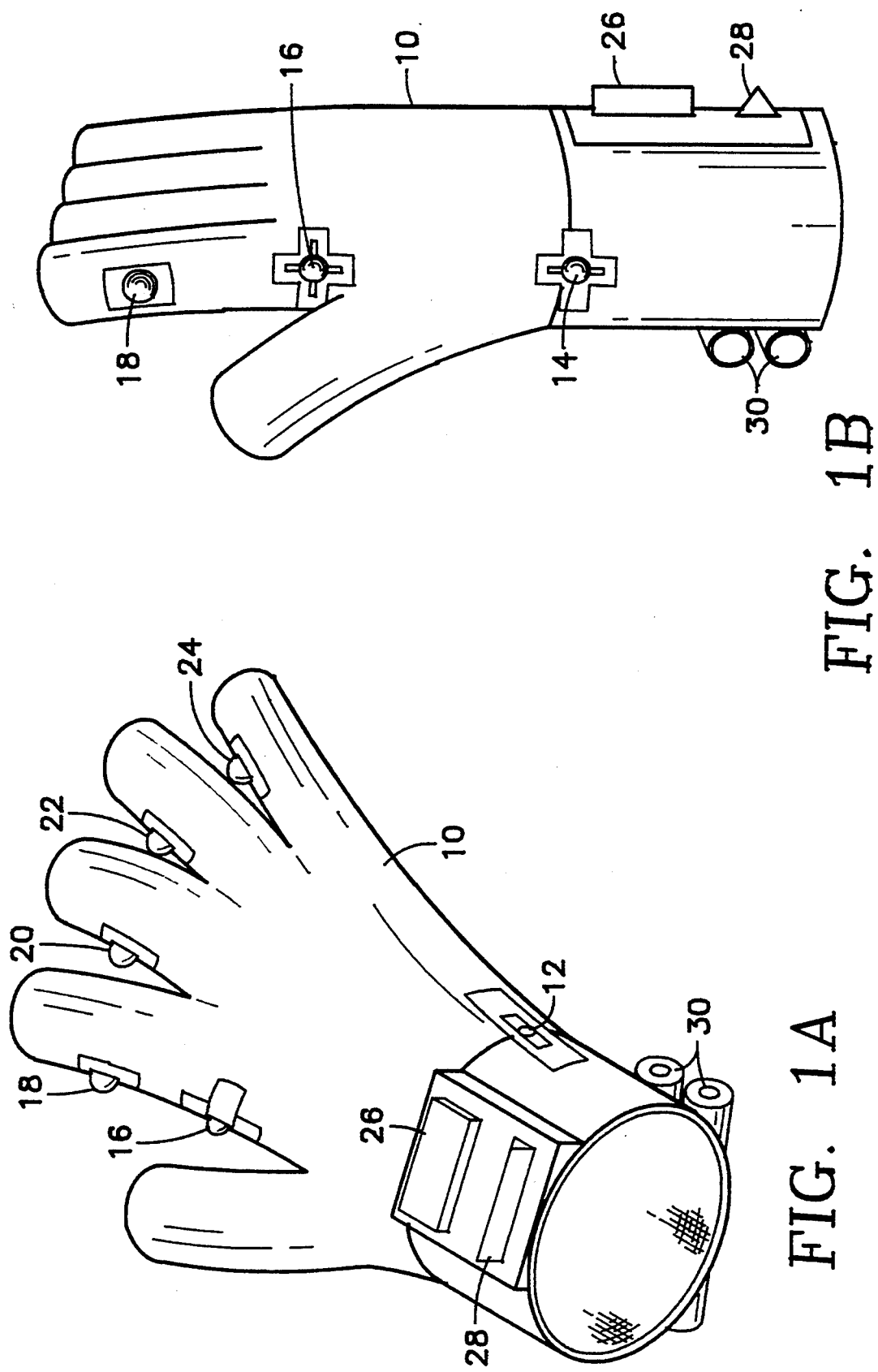

COMPUTER MOUSE GLOVE WITH REMOTE COMMUNICATION

BACKGROUND OF THE INVENTION

1. Technical Field

The invention is related to improvements in a computer mouse of the type which controls cursor movement in the X-Y plane of a video display and the "click" controls for the cursor which implement the "select" function, the "drag" function and so forth.

2. Background Art

As used in this specification, the term "computer mouse" refers to the type of user interface device which permits a computer operator to move a cursor in any direction in the plane of a computer-generated video display and to exercise any one of a predetermined set of control functions at any location of the cursor. These functions are well-known in the art and include a "select" function, a "drag" function and so forth. Typically, a computer mouse is a hand-held device which the operator rolls over the X-Y plane of a digitizer tablet, for example, to move the cursor in the video display. The mouse typically has two to three "click" buttons which enable the operator to exercise the predetermined set of functions including "select" and "drag". The mouse includes logic circuitry wired to the computer. The operator uses the mouse to control cursor movement and uses a keyboard for data entry.

The main disadvantage of the conventional computer mouse is that the operator must remove one hand from the computer keyboard whenever it is desired to operate the mouse and to re-establish the position of the hand on the keyboard after finishing a given movement of the mouse. Thus, there arises an inherently wasteful "back-and-forth" motion of the hand between the mouse (whose position on the digitizing tablet varies from time-to-time) and the keyboard.

Various prior art techniques are known for replacing the keyboard with a hand-worn device, such as a glove equipped with finger-actuated sensing devices, but such techniques have nothing to do with a computer mouse. Specifically, such techniques have nothing to do with directly converting finger or wrist motion direction to cursor motion direction on the video display. Instead, these prior art techniques only disclose the concept of typing or entering individual characters through a handworn device.

For example, U.S. Pat. No. 4,414,537 discloses a glove interface for digital data entry for entering specified characters one-by-one in the manner of a computer keyboard. A similar technique is disclosed in U.S. Pat. No. 4,905,001. This technique is coupled with a light pen in U.S. Pat. No. 4,540,176. U.S. Pat. No. 4,988,981 discloses interpreting hand motion signals by mounting a transmitter on the glove and aiming it at receivers located at various positions near the periphery of the video display. This technique suffers from the disadvantage that the operator must aim his hand carefully in order to effect communication. U.S. Pat. No. 3,022,878 discloses a hand-mounted keyboard. U.S. Pat. No. 4,954,817 discloses mounting a miniaturized digitizer tablet on one finger and a stylus ring on another finger to implement a conventional mouse/digitizer tablet system. This latter concept has nothing to do with directly translating a wrist or finger motion direction to cursor motion direction.

SUMMARY OF THE INVENTION

The invention is a hand-mounted motion sensing device in communication with a computer which directly converts movement of the finger or wrist, for example, to cursor movement on the computer's video display. The direction of the anatomical movement (of the finger or wrist, for example) determines the direction of the cursor movement. Thus, as the computer operator moves his finger, the video display cursor follows the motion of the finger in the two-dimensional plane of video display.

In one preferred embodiment of the invention, left-right movement of the wrist controls the horizontal component of the cursor movement in the video display while up-down movement of the index finger controls the vertical component of the cursor movement. Additional sensors permit other fingers to control "click" buttons on the hand-worn device for implementing the select and drag functions, for example.

BRIEF DESCRIPTION OF THE DRAWINGS

FIGS. 1a and 1b are perspective and elevational views, respectively, of a preferred embodiment of the invention.

DETAILED DESCRIPTION OF THE PREFERRED EMBODIMENT

Figure 2A:
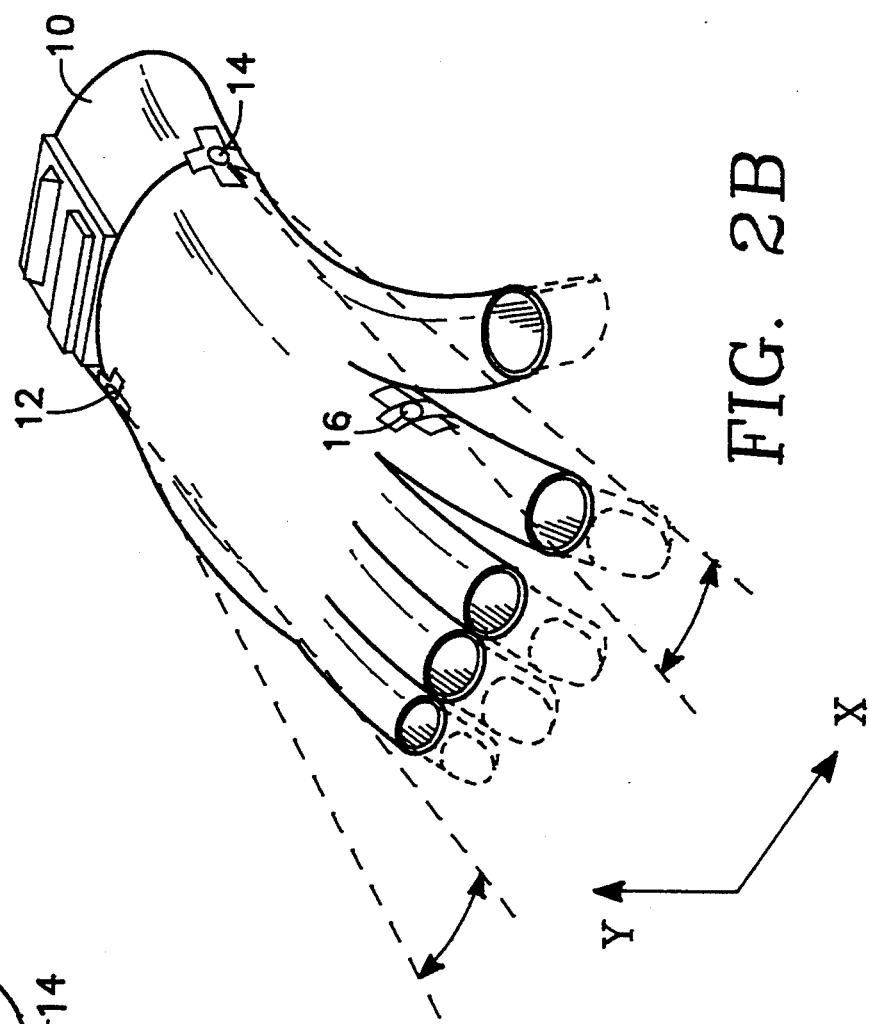
FIGS. 2a and 2b are diagrams illustrating horizontal and vertical cursor movement control by the preferred embodiment of FIGS. 1a and 1b.

Referring to FIGS. 1a and 1b, the preferred embodiment of the invention includes a glove 10 worn on one hand of the computer operator. As clearly shown in FIGS. 2a, 2b and 3, the glove 10 is fingertipless. The glove 10 supports right and left wrist motion sensor switches 12, 14, which detect lateral wrist motion to the right and left, respectively. The switches 12 and 14 are located on the glove 10 at the right and left sides, respectively, of the operator's wrist joint. The glove 10 further supports an up-down index finger motion sensor switch 16 which detects up and down motion of the operator's index finger. The switch 16 is located on the glove 10 at the joint between the operator's index finger and hand. Switches 18, 20, 22, 24 are located on the glove 10 near the middle of respective ones of the index, middle, fourth and fifth fingers, respectively, on the side of the finger facing the operator's thumb. These switches are controlled by the operator pushing on them with his thumb on the same hand. In the example of FIG. 1a, the switch 18 is an ON/OFF switch, while the switches 20 through 24 serve as "click" buttons which perform the various mouse functions referred to above, including "select" and "drag". Thus, in this embodiment, all "mouse" functions, including the motion and click functions, are performed by one hand with the glove 10.

Near the operator's wrist, the glove supports a microprocessor 26 having parallel inputs individually connected to the switches 12 through 24, an infrared transmitter 28 and a set of batteries 30.

In the preferred embodiment of FIGS. 1a and 1b, the up/down index finger motion sensing switch 16 comprises two switches, namely a first switch 16a (see FIG. 4) which has an "ON" position attained whenever the index finger is rotated downward from the plane of the operator's hand through at least a threshold rotation (as illustrated in FIG. 2a), a second switch (see FIG. 4) which has an "ON" position attained whenever the index finger is rotated upward from the plane of the operator's hand through at least a threshold rotation. Both switches 16a and 16b are normally "OFF" whenever the index finger is displaced neither up nor down through at least a threshold rotation.

Figure 2B:
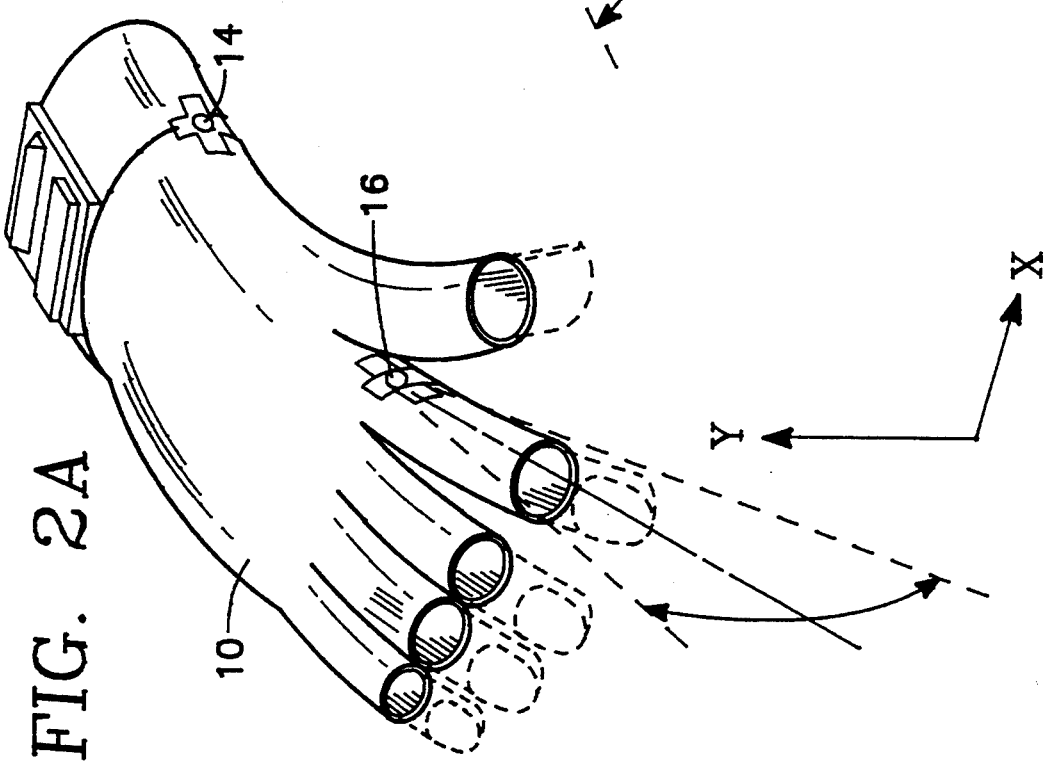

In the preferred embodiment of FIGS. 1a and 1b, the right and left wrist motion sensor switches 12 and 14 are each simple microswitches which are normally "OFF" unless compressed by lateral rotation of the operator's wrist to the right or left, respectively, in the plane of the operator's hand, as illustrated in FIG. 2b. Thus, the right microswitch 12 is compressed—turned ON— whenever the operator's wrist rotates to the right through at least a threshold rotation, while the left microswitch 14 is turned ON whenever the wrist rotates to the left through at least a threshold rotation.

Figure 3:
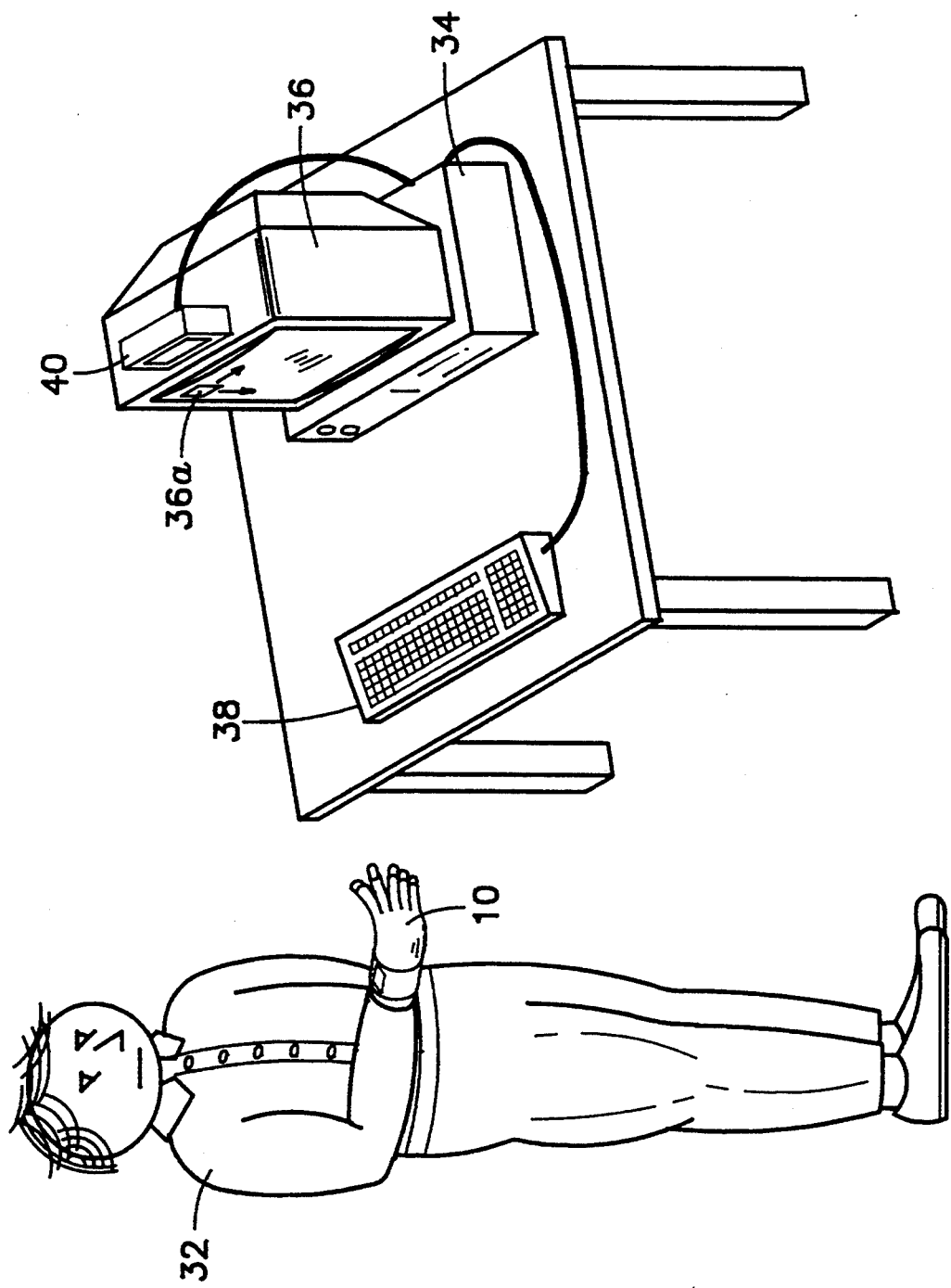
FIG. 3 is a perspective view of a desktop computer system embodying the invention.

Referring to FIG. 3, a system embodying the invention includes the glove 10 of FIGS. 1a and 1b, including the switches 12 through 24, worn by a computer operator 32, a computer 34 (such as a desk top personal computer), a video display monitor 36 connected to the computer 34, a keyboard 38 connected to the computer 34 and an infrared receiver 40 connected to the computer 34. In one implementation, the infrared receiver 40 is connected to a standard RS 232 serial port of the computer 34. The infrared receiver 40 of the desk top computer 34 receives signals transmitted by the infrared transmitter 36 of the glove 10. The computer 34 is programmed to respond to data received at its RS 232 serial port as if such data emanated from a standard mouse, using any well-known standard software package.

The glove microprocessor 26 is programmed to translate inputs from respective ones of the motion sensing switches 12, 14, 16 to appropriate command data identical to the command data transmitted by a conventional mouse system to a computer upon right, left, up or down motion of the mouse in the plane of its digitizer tablet. Thus, the microprocessor 26 generates a "right" command data whenever the switch 12 is ON, a "left" command data whenever the switch 14 is ON, a "down" command data whenever the switch 16 is in its first ON position and an "up" command data whenever the switch 16 is in its second ON position. Such command data is converted to infrared signals by the infrared transmitter 28 and transmitted to the infrared receiver 40. The infrared receiver 40 converts the received infrared signals back to the appropriate command data and transmits it to the serial port of the computer 34.

Figure 4:
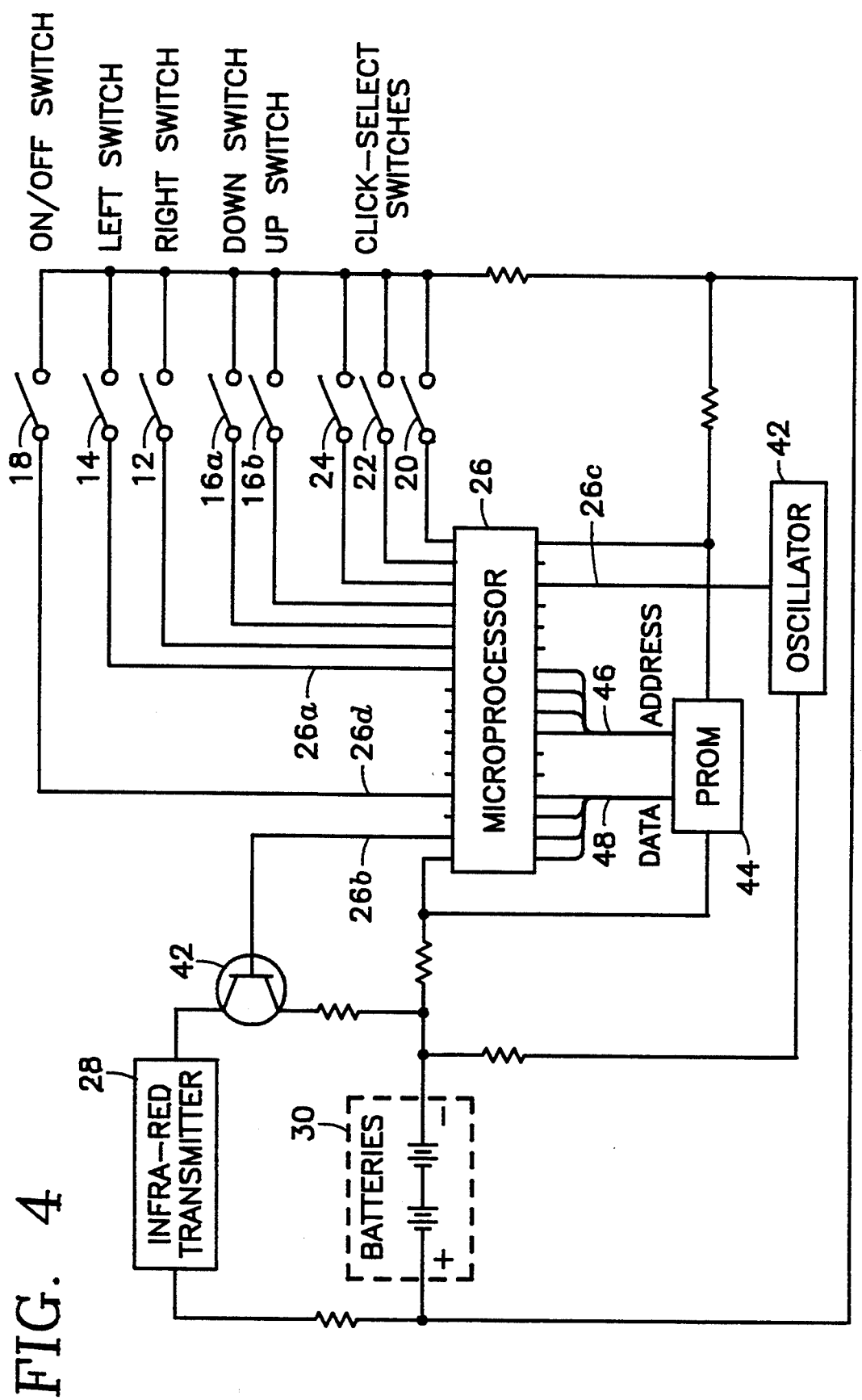
FIG. 4 is a schematic diagram of a circuit implementation of the preferred embodiment of FIGS. 1a and 1b.

FIG. 4 illustrates one generalized circuit implementation of the switch, microprocessor and transmitter elements supported by the glove 10. Each of the switches 12, 14, 16a, 16b, 18, 20, 22, etc. is connected so as to complete a circuit between the batteries 30 and a respective one of a set of input terminals 26a of the microprocessor 26. An output terminal 26b of the microprocessor 26 controls the infrared transmitter 28 through an input transistor or buffer 42. The transmitter 28, the microprocessor 26 as well as a programmable read-only memory (PROM) 44 are powered by the batteries 30.

The microprocessor 26 executes a program embodied in a set of micro-instructions stored in the PROM 44 in synchronism with a clock signal generated by an oscillator 49 connected to a clock terminal 26c of the microprocessor 26. The microprocessor 26 accesses these micro-instructions in a programmed sequence in the well-known manner by transmitting address bytes on an address bus 46 connected to the PROM and receiving instruction data from the PROM 44 on a data bus 48.

Figure 5:
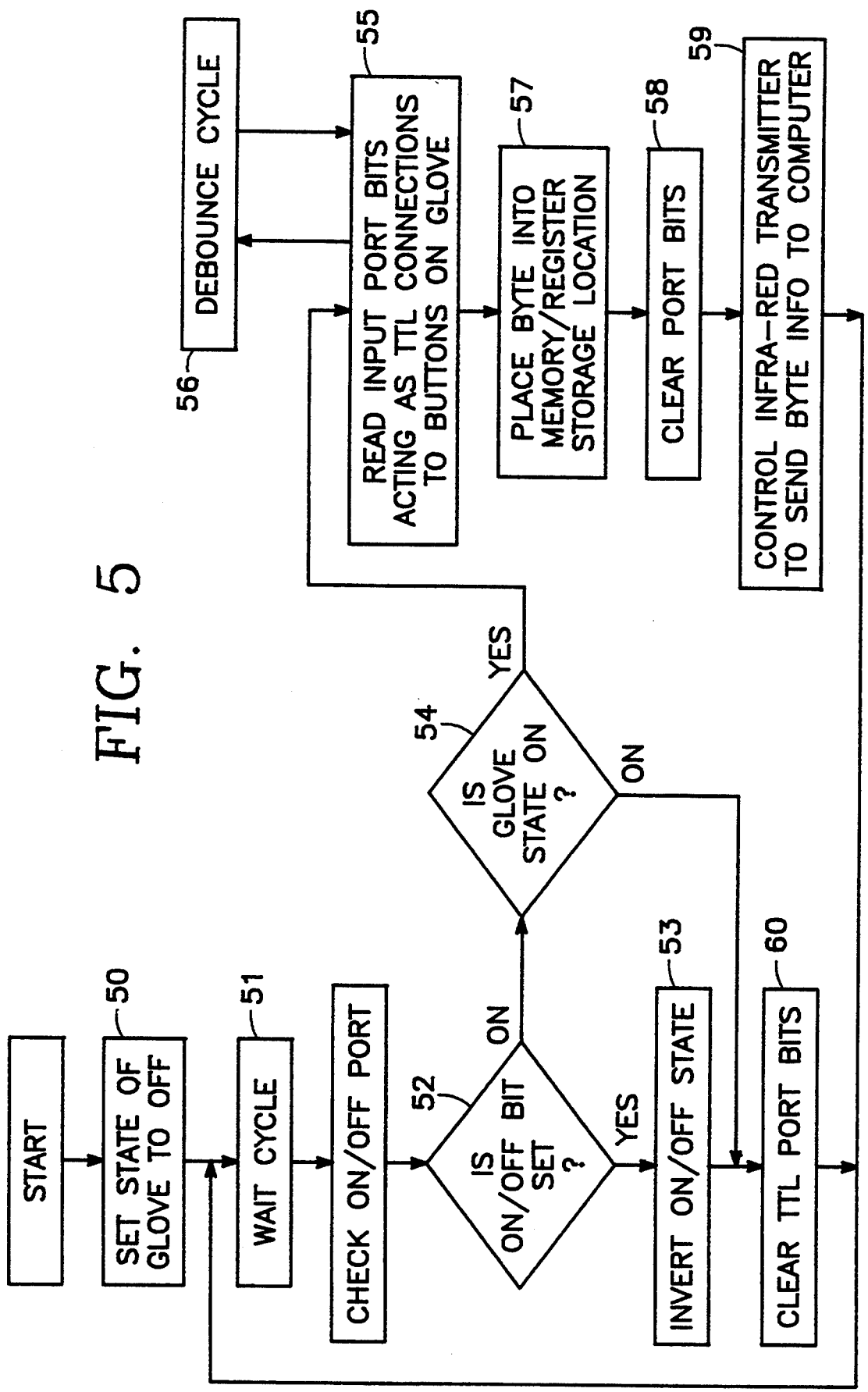
FIG. 5 is a flow diagram illustrating the operation of the preferred embodiment of FIGS. 1a and 1b.

The sequence of micro-instructions stored in the PROM 44 implement the process illustrated in FIG. 5. The first step of this process is to set the state of the glove to OFF (block 50 of FIG. 5). A wait cycle is then performed which lasts for one computer clock cycle (block 51 of FIG. 5). Next, the microprocessor checks its ON/OFF terminal 26d. If the ON/OFF bit controlled by the ON/OFF terminal 26d is set (YES branch of block 52 of FIG. 5), then the state of the ON/OFF bit is inverted (block 53 of FIG. 5). Then, the input bits controlled by the microprocessor input terminals 26a are cleared (block 60 of FIG. 5) and the steps of blocks 51 through 52 are repeated. This time, however, the ON/OFF bit is not set (NO branch of block 52), and the next step is to determine whether the glove state is set to ON (block 54 of FIG. 5). If the glove state is still OFF (NO branch of block 54, the steps of blocks 51 through 52 are again repeated. Otherwise (YES branch of block 54), the microprocessor 26 reads the states of its input terminals 26a (block 55 of FIG. 5). It then waits one debounce cycle (shown as to block 56 of FIG. 5) and repeats the reading step of block 55. If the states of the input terminals 26a have not changed during the debounce cycle of block 56, then the microprocessor 26 translates the states of its input terminals 26a to mouse command data in the manner previously discussed. Specifically, it latches the state of the switches 12, 14, 16a, 16b as one bit of information per switch (in the processor's onboard ports). Similarly, the status of the "click" switches is saved via the processor's onboard ports. After a brief debounce cycle to verify that the condition of the bits is stable (block 56 of FIG. 5), the condition of the bits is ready to be used. These bits will become part of a command byte (block 57 of FIG. 5) or "status register" which saves the overall-motion and click status of the glove for serial output by the transmitter. The former status of the switches is cleared and overwritten (in the appropriate register bits for the output port - not shown in the drawings) with the current state of the glove (block 58 of FIG. 5). This is then serially transmitted on the output terminal 26b to the transmitter 28 (block 59 of FIG. 5). The process then returns to the wait cycle of block 51.

The computer 34 receives the command data from the infrared receiver 40 and moves the cursor 36a by a predetermined amount either up or down and either right or left by predetermined increments in the video display, depending upon command data received. As a result, whenever the operator activates the glove 10 by pressing the ON/OFF button 16, the video display cursor 36a begins following the motion of his index finger in the two-dimensional video display. Alternatively, or in addition, if the operator has pushed one of the "click" buttons 18 through 22 corresponding to the select function, then the computer 34 responds by opening a menu on whose symbol in the video display the cursor 36a may be located at the time. If the operator has pushed one of the "click" buttons 18 through 22 corresponding to the drag function, then the computer 34 highlights an area in the video display which the cursor 36a sweeps through, in the well-known manner. Each of the "click" buttons 18 through 22 is assigned to control one of the various "click" functions such as the select function and the drag function. These functions shall be referred to hereinafter as "mouse click function", by which is meant the well known functions implemented in standard software packages using the click buttons on a standard computer mouse.

When the operator 32 desires to resume typing on the keyboard 38 with his glove hand, he presses the ON/OFF button 16 again to de-activate the glove 10 so that the cursor 36a ceases responding to movements of his index finger.

The invention is not limited to the specific details disclosed herein. For example, the communication link between the glove 10 and the computer 34 may be other well known devices, rather than the infrared transmitter and receiver system disclosed herein. Furthermore, the devices 12 through 24 of FIGS. 1a and 1b for sensing anatomical movements may be any other suitable device rather than the microswitches disclosed herein. As but one of many possible examples, piezo-electric devices which generate electric signals when compressed or otherwise mechanically stressed may be employed as the devices 12 through 24. In yet another variation of the invention, two gloves could be employed, some of the switches being mounted on one glove and the remainder on the other glove. In a further variation, both the vertical and lateral motion of the cursor is controlled by the index finger, rather than the wrist. In this latter embodiment, all of the direction or motion-sensing switches 12, 14, 16a and 16b are located on the glove 10 on the index finger, so that the cursor 36a follows the motion of the index finger (left/right and up/down) in the two-dimensional plane of the video display 36.

While the invention has been described in detail with specific reference to preferred embodiments thereof, other variations and modifications thereof may be made without departing from the true spirit and scope of the invention.

What is claimed is:

1. Apparatus for providing a computer mouse function on the hand of a computer operator relative to a computer controlling a video display capable of displaying graphics and having a cursor moveable in said video display in at least opposing UP and DOWN directions in said video display, said apparatus comprising:
    a glove-like body to be worn on the hand of the computer operator;
    first direction sensing means for sensing the direction of movement of an index finger of said hand relative to said hand mounted on said glove-like body near a joint of said index finger, said first direction sensing means consisting of UP and DOWN microswitches near opposite sides of said joint, each one of said UP and DOWN microswitches having and ON state and an OFF state and being confined on a surface of said glove to a respective area generally centered about said joint of said index finger, leaving said index finger freely movable;
    means mounted on said glove-like body for converting outputs of said UP and DOWN microswitches to a plurality of sequential chronologically independent respective UP and DOWN move commands to move said cursor in respective ones of said UP and DOWN directions in said video display for as long as a respective one of said UP and DOWN microswitches is in said ON state; and
    means for conveying said commands to said computer, whereby movement of said cursor on said video display reflects bending of said index finger about said joint.

2. The apparatus of claim 1 further comprising a set of click buttons mounted at different locations on said glove-like body, wherein said means for converting further comprises means for generating respective mouse click commands in response to respective ones of said click buttons being pushed, and wherein said means for conveying further comprises means for conveying said respective mouse click commands to said computer.

3. The apparatus of claim 1 further comprising an ON/OFF button mounted on said glove-like body, whereby said operator may temporarily deactivate said apparatus whenever it is desired to move said hand without affecting movement of said cursor.

4. The apparatus of claim 3 wherein said mouse click functions comprise a set function and a drag function.

5. The apparatus of claim 1 further comprising second direction sensing means comprising RIGHT and LEFT microswitches near opposite sides of a wrist joint of said hand.

6. The apparatus of claim 2 wherein said means for converting comprises a microprocessor connected to first and second direction sensing means, said microprocessor being programmed to respond to respective ones of said first and second direction sensing means whereby to produce UP/DOWN and RIGHT/LEFT cursor movement commands in response to said first and second direction sensing means, respectively; and
    wherein said means for conveying comprise a remote transmitter mounted on said glove-like body and connected to receive cursor movement commands generated by said microprocessor, said transmitter comprising means for transmitting said commands, and a receiver connected to said computer and comprising means for receiving the commands transmitted by said transmitter whereby to enable said computer to respond to said commands.

7. The apparatus of claim 6 wherein said transmitter and receiver comprises an infrared transmitter and an infrared receiver.

8. The apparatus of claim 1 wherein said means for converting comprises an on-board microprocessor mounted on said glove-like body and programmed to convert analog signals from said means for sensing to digital signals comprising said commands.

9. The apparatus of claim 8 further comprising a battery on-board said glove-like body providing power to said on-board micro-processor.

10. The apparatus of claim 1 herein said glove-like body is fingertipless.

11. Apparatus for providing a computer mouse function on the hand of a computer operator relative to a computer controlling a video display capable of displaying graphics and having a cursor moveable in said video display in at least opposing UP and DOWN directions in said video display, said apparatus comprising:
    a glove-like body to be worn on the hand of the computer operator;
    first direction sensing means for sensing the direction of movement of an index finger of said hand relative to said hand mounted on said glove-like body near a joint of said index finger, said first direction sensing means consisting of microswitch means adjacent said joint for generating signals indicative of direction of movement of said index finger, said microswitch means having a first ON state indicative of movement of said index finger in an UP direction relative to said hand and a second ON state indicative of movement of said index finger in a DOWN direction relative to said hand, said cursor being movable in response to said microswitch means in said UP and DOWN directions only said microswitch means being confined on a surface of said glove to an area adjacent said joint of said index finger, leaving said index finger freely movable;

means mounted on said glove-like body for converting outputs of said microswitch means to a plurality of sequential chronologically independent respective UP and DOWN move commands to move said cursor in respective ones of said UP and DOWN directions in said video display for as long as said microswitch means is in a respective one of said first and second ON states; and means for conveying said commands to said computer, whereby movement of said cursor on said video display reflects bending of said index finger about said joint.

12. Apparatus for providing a computer mouse function on the hand of a computer operator relative to a computer controlling a video display capable of displaying graphic and having a cursor moveable in said video display in at least a first direction and a second direction in said video display, said first direction being opposite said second direction, said apparatus comprising:

a glove-like body to be worn on the hand of the computer operator;

direction sensing means for sensing the direction of movement of an index finger of said hand relative to said hand in at least each of two opposing directions of movement of said index finger, said direction sensing means being mounted on said glove-like body near a joint of said index finger, said direction sensing means consisting of microswitch means adjacent said joint for generating signals indicative of direction of movement of said index finger, said microswitch means having an ON state and an OFF state for each one of said two opposing directions of movement of said index finger, said cursor being movable in response to said microswitch means in said first and second directions only, said microswitch means being confined on a surface of said glove to a respective area adjacent said joint of said index finger, leaving said index finger freely movable;

means mounted on said glove-like body for converting outputs of said microswitch means to a plurality of sequential chronologically independent respective direction and second direction move commands move said cursor in respective ones of said first direction and second direction in said video display for as long as said microswitch means is in the ON state corresponding to a respective one of said two opposing directions of movement of said index finger; and means for conveying said commands to said computer, whereby movement of said cursor on said video display reflects bending of said index finger about said joint.

* * * * *